United States Defensive Publication [19] (H) [11] T105,202

Barton [43] Mar. 5, 1985

[54] PROCESS FOR PREPARING WATER DISSIPATABLE POLYESTER AND USE THEREOF

[76] Inventor: Kenneth R. Barton, 201 Claymore Dr., Kingsport, Tenn. 37663

[21] Appl. No.: 632,929

[22] Filed: Jul. 20, 1984

[51] Int. Cl.[3] ..... B32B 27/34; B32B 27/36

[52] U.S. Cl. ..... 428/395; 427/220; 427/389.8; 528/290; 528/295; 528/302; 528/488; 528/489

[57] ABSTRACT

Disclosed is the preparation of water-dissipatable polyesters and polyesteramides wherein at least a part of one of the monomeric components from which it is derived is a polycarboxylic acid or polyhydric alcohol which contains a sulfonic acid salt moiety derived from a nitrogen-containing base having an ionization constant in water at 25° C. of $10^{-3}$ to $10^{-10}$. Also disclosed is the use of such polymers as sizes for fibers of glass, ceramics, etc., where the size is removed by burning and little or no ash residue is important.

10 Claims, No Sheets Drawing,

21 Pages Specification

The file of this unexamined application may be inspected and copies thereof may be purchased (849 O.G. 1221, Apr. 9, 1968).